2,919,242
PROCESS FOR PRODUCING AUXILIARY LIQUIDS FOR THE POLYMERIZATION OF ETHYLENE

Helmut Kolling, Duisburg-Hamborn, and Nikolaus Geiser, Oberhausen-Holten, Germany, assignors to Ruhrchemie Aktiengesellschaft, Oberhausen-Holten, Germany No Drawing. Application February 6, 1957
Serial No. 638,448

Claims priority, application Germany February 22, 1956

5 Claims. (Cl. 208—143)

The polymerization of ethylene at pressures below about 100 kg./sq. cm. and at temperatures up to about 100° C. is known. In this process, use is made of catalysts which consist of mixtures of organometallic compounds, especially aluminium alkyl compounds, with compounds of metals of the 4th to 6th subgroups of the periodic system (see Belgian Patents Nos. 532,362 and 534,792 and "Angewandte Chemie" 67, 541–547 (1955)). In this synthesis, use is generally made of an auxiliary liquid in which the polyethylene formed is suspended. The auxiliary liquid serves to ensure good agitation of the reaction mixture until the synthesis is terminated thus permitting the removal of the heat of reaction. It is necessary that the hydrocarbon fractions used as auxiliary liquid be very carefully freed from moisture and oxygen-containing compounds since otherwise the course of polymerization is disturbed. In general, the polymerization of ethylene is also impaired by a content of unsaturated hydrocarbons in the auxiliary liquid. Up to the present, fractions of aliphatic hydrocarbons in the gasoline or diesel oil boiling range have most widely been used as auxiliary liquid. Several processes have already been proposed for the preparation and purification of fractions of this kind.

In many cases, purely aliphatic hydrocarbon fractions as obtained, for example, in the Fischer-Tropsch synthesis, are not available. Hydrocarbon fractions derived from petroleum frequently consist of mixtures of aliphatics, naphthenes and aromatics. Fractions of this kind cannot be used directly as auxiliary liquids for the polymerization of ethylene. Especially due to the impurities contained therein, e.g. the sulfur-containing compounds, they cause considerable disturbances in the course of the polymerization. In our copending application of even date it has been suggested to prepare suitable hydrocarbon mixtures for this purpose from petroleum by first subjecting petroleum-derived distillates in the gasoline or diesel oil boiling range, in the vapor state and at temperatures between 400 and 600° C., to a refining over $Al_2O_3$ and/or $SiO_2$-containing catalysts, subsequently passing them over a hydrogenation catalyst, and then drying them. It is also possible to hydrogenate suitable fractions over sulfur-proof catalysts without a previous high-temperature refining over $Al_2O_3$ and/or $SiO_2$-containing catalysts. Particularly good results have been obtained, however, by combining the two measures.

The process of the invention offers the possibility of still further improving the purity of hydrocarbon fractions of this kind and of considerably increasing the yield of polyethylene based on the quantity of catalyst added. It has been found that hydrocarbon mixtures can easily be produced from petroleum which are suitable as auxiliary liquids for the polymerization of ethylene effected at pressures of below 100 kg./sq. cm. and at temperatures up to about 100° C. with the use of catalysts consisting of mixtures of organometallic compounds, especially aluminum alkyl compounds, with compounds of metals of the 4th to 6th subgroups of the periodic system, especially titanium compounds, and that particularly favorable results are obtained if petroleum distillates in the gasoline or diesel oil boiling range are first refined in the vapor state and at temperatures between about 400 and 600° C. over $Al_2O_3$ and/or $SiO_2$-containing catalysts and/or are passed, with hydrogen or hydrogen-containing gases, over a hydrogenation catalyst and dried, whereupon the distillates, prior to being charged to the polymerization reactor, are mixed with small amounts of the catalyst used for the polymerization or its individual components, preferably with titanium tetrachloride, while carefully excluding moisture, and are then separated from the precipitate formed.

Thus, it is a requirement of the process of the invention that either a high-temperature refining and a hydrogenation or only a hydrogenation be effected prior to the treatment with small amounts of the catalyst used for the polymerization. The treatment with the catalyst results in the separation, among other impurities, of the last portions of water which cannot be removed by drying with conventional drying agents. It is absolutely necessary to remove the precipitate formed in the treatment with the catalyst or its components, since otherwise further quantities of catalyst would be destroyed by these decomposition products of the catalyst or its compositions during the course of the subsequent polymerization. The increased yield of polyethylene obtained by the working method of the invention involves a reduction of the ash content of the polyethylene produced in the polymerization. Therefore, a number of operational steps previously required for removing the ash from the raw product can be eliminated.

The treatment of the auxiliary liquid with the polymerization catalysts or its components is preferably effected in a vessel with stirrer at elevated temperatures of as high as about 100° C. Working at elevated temperature has the advantage that the purifying effect of the catalyst or its component is higher and that the formed precipitate will settle more readily and its removal will be easier. This removal can be effected by settling and/or filtration; in some cases, filter aids may be used. If necessary, the auxiliary liquid should be subjected to a distillation after separation of the precipitate.

Moreover, it has been found favorable to effect the treatment of the auxiliary liquid with the polymerization catalyst or its components in the presence of ethylene, since this results in the formation of a small amount of polyethylene which acts as a filter aid. Very good results have been obtained by the treatment of the petroleum-derived hydrocarbon fractions with titanium tetrachloride.

It is advantageous to proportion the quantity of the polymerization catalyst or its components so that the auxiliary liquid contains only a small excess of these compounds. Therefore, the hydrocarbon mixtures should have a content of catalyst or its components of below 0.1 gram/liter and preferably below 0.05 gram per liter after the separation of the precipitate formed by the addition of the catalyst or its components. The quantity required is preferably determined by a preceding small-scale laboratory test in which the content of catalyst or its components in the filtrate is determined after the precipitate formed has been separated.

In the following, the process according to the invention will be more fully described in the example but it should be understood that this is given by way of illustration and not of limitation and that many changes may be made in the details without departing from the spirit of the invention.

Example

A distillate derived from Arabian crude, boiling between 80 and 180° C. and having a sulfur content of 0.07% by weight is passed over a catalyst consisting of $Al_2O_3$ at 520° C. and at a rate of 1 part by volume of liquid distillate per 1 part by volume of catalyst per hour. The sulfur content of the refined product amounts to 0.006% by weight. Subsequently, the refined product is passed, at a pressure of 20 kg./sq. cm., in upward direction through a vertical tube 6 meters long and having an inside diameter of 50 mm. filled with pieces of nickel catalyst. The catalyst has the following composition: 100 parts of nickel, 15 parts of magnesia and 100 parts of kieselghur. The reaction temperature is maintained at 200° C., the residence time in the reaction chamber is about 2 hours. The product thus treated is then passed through a vertical tube 4 meters long and having an inside diameter of 200 mm. filled with granular calcined calcium chloride, the residence time being about 1.5 hours. The final product obtained has a sulfur content of 0.0007% by weight and a content of aromatics of 1%. The analytical characteristics such as neutralization number, saponification number, hydroxyl number and iodine number are zero. The total oxygen contents amounts to 0.0035% as determined with phenyl isopropyl potassium.

A portion of the hydrocarbon fraction thus prepared is then mixed under an atmosphere of dry nitrogen, with the catalyst used for the polymerization and consisting of 1.0 mol of titanium tetrachloride and 1.2 mols of diethyl aluminum monochloride, adding 0.25 gram of polymerization catalyst per liter of the hydrocarbon fraction. The precipitate formed is filtered off in an atmosphere of dry nitrogen.

Another portion of the hydrocarbon fraction is processed in the same manner with diethyl aluminum monochloride in a nitrogen atmosphere, adding 0.15 gram of diethyl-aluminum monochloride per liter of the hydrocarbon fraction. Here again, the precipitate formed is subsequently separated.

Finally, a third portion of the hydrocarbon fraction is stirred up in the same manner with 0.15 gram of titanium tetrachloride per liter of the hydrocarbon fraction, and separated from the precipitate formed.

By way of comparison, one polymerization each is now effected with the hydrocarbon fraction purified by refining and hydrogenation, and with the hydrocarbon fractions subsequently treated with the polymerization catalyst, diethyl-aluminum monochloride and titanium tetrachloride, respectively. For that purpose, 2 liters of the hydrocarbon fraction are filled into a stirring vessel of 5 liters capacity, which had been carefully flushed with highly purified ethylene gas. After heating-up of the hydrocarbon fraction to about 50° C., the catalyst solution is added while constantly stirring and passing through ethylene. The catalyst solution is prepared by mixing together 70 cc. of hydrocarbon fraction, 0.64 gram of diethyl aluminum monochloride and 0.86 gram of titanium tetrachloride and intensively stirring the mixture for about 30 minutes. After the addition of the catalyst solution, the temperature increases to about 70° C. After the first hour of reaction has elapsed, 3 cc. of air carefully freed from moisture and other disturbing impurities, are added hourly to the inflowing ethylene gas stream, within 1–2 minutes. After the conversion of ethylene is completed, the following yields of polyethylene are obtained:

| | Grams of polyethylene per gram of catalyst |
|---|---|
| Hydrocarbon auxiliary liquid not pretreated with catalyst | 305 |
| Hydrocarbon auxiliary liquid treated with catalyst | 545 |
| Hydrocarbon auxiliary liquid pretreated with diethyl aluminum monochloride | 465 |
| Hydrocarbon auxiliary liquid pretreated with titanium tetrachloride | 594 |

This corresponds to an increase in yield by 79% for the pretreatment with catalyst, by 53% for the pretreatment with diethyl aluminum monochloride, and by 95% for the pretreatment with titanium tetrachloride.

What we claim is:

1. A process for producing, from petroleum, hydrocarbon mixtures to be used as auxiliary liquids for the polymerization of ethylene effected at pressures below about 100 kg./sq. cm. and at temperatures up to about 100° C. with the use of catalysts consisting of mixtures of aluminum alkyl compounds with titanium tetrachloride, which comprises first subjecting said petroleum-derived distillates in the gasoline and diesel oil boiling range, in the vapor state to a catalytic refining treatment including passage, at temperatures between about 400 and 600° C., over a catalyst selected from the group consisting of $Al_2O_3$, $SiO_2$, and a mixture thereof, and a passage of said distillates together with a hydrogen-containing gas at temperatures between about 150 and 300° C. over a hydrogenation catalyst, drying the purified and hydrogenated distillates, and finally mixing the distillates, prior to being charged to the polymerization reactor, with small amounts of the catalyst used for the polymerization of ethylene, while carefully excluding moisture, and separating them from the precipitate formed.

2. The process according to claim 1, wherein the polymerization catalyst used in the last step of the hydrocarbon treatment is titanium tetrachloride.

3. The process according to claim 1, in which said treatment of the auxiliary liquid with polymerization catalyst is effected at temperatures up to 100° C. in a stirring vessel and in the presence of ethylene.

4. The process according to claim 1, in which the quantity of the polymerization catalyst remaining in the hydrocarbon fraction after it has been separated from the precipitate formed, is less than 0.1 gram per liter.

5. The process according to claim 1, in which the quantity of the polymerization catalyst remaining in the hydrocarbon fraction after it has been separated from the precipitate formed, is less than 0.05 gram per liter.

References Cited in the file of this patent

UNITED STATES PATENTS

| | | |
|---|---|---|
| 1,865,235 | Cross | June 28, 1932 |
| 2,073,973 | Muckenfuss | Mar. 16, 1937 |
| 2,419,029 | Oberfell | Apr. 15, 1947 |
| 2,421,320 | Ernest | May 27, 1947 |
| 2,461,069 | Marisic et al. | Feb. 8, 1949 |
| 2,721,189 | Anderson et al. | Oct. 18, 1955 |
| 2,769,753 | Hutchings et al. | Nov. 6, 1956 |
| 2,769,762 | Annable et al. | Nov. 6, 1956 |
| 2,771,401 | Shepherd | Nov. 20, 1956 |

FOREIGN PATENTS

| | | |
|---|---|---|
| 538,782 | Belgium | Dec. 6, 1955 |